United States Patent
Georgin et al.

(10) Patent No.: US 12,552,521 B1
(45) Date of Patent: Feb. 17, 2026

(54) ELECTROMECHANICAL BRAKE INTERLOCK

(71) Applicant: GOODRICH CORPORATION, Charlotte, NC (US)

(72) Inventors: Marc J Georgin, Oakwood, OH (US); Gregory M Hickey, Bellbrook, OH (US); Paul R Burte, Clayton, OH (US); Eric G Stein, Dayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 35 days.

(21) Appl. No.: 18/802,631

(22) Filed: Aug. 13, 2024

(51) Int. Cl.
*B64C 25/44* (2006.01)
*B60T 8/32* (2006.01)
*B60T 13/74* (2006.01)

(52) U.S. Cl.
CPC ............. *B64C 25/44* (2013.01); *B60T 8/325* (2013.01); *B60T 13/741* (2013.01)

(58) Field of Classification Search
CPC ......... B64C 25/44; B60T 8/325; B60T 13/741
See application file for complete search history.

(56) References Cited

U.S. PATENT DOCUMENTS

| | | | |
|---|---|---|---|
| 7,618,100 B2 | 11/2009 | Griffith et al. | |
| 7,766,431 B2 | 8/2010 | Griffith et al. | |
| 8,393,689 B2 | 3/2013 | Griffith et al. | |
| 12,116,112 B2* | 10/2024 | Howell | B60T 8/325 |
| 2006/0038673 A1* | 2/2006 | Chapman | G07C 9/00714 340/309.16 |
| 2008/0142318 A1* | 6/2008 | Griffith | B60T 8/1703 701/3 |
| 2008/0149436 A1* | 6/2008 | Griffith | B60T 13/746 188/110 |
| 2008/0150353 A1* | 6/2008 | Griffith | B60T 7/12 477/208 |
| 2011/0040466 A1* | 2/2011 | Hill | B60T 8/885 701/74 |
| 2011/0079471 A1* | 4/2011 | Colin | B60T 17/221 188/106 P |
| 2015/0127195 A1* | 5/2015 | Cahill | B64C 25/44 701/3 |
| 2017/0234380 A1* | 8/2017 | Yasui | F16D 63/006 188/72.1 |
| 2019/0031170 A1* | 1/2019 | Mastrocola | B64C 25/44 |

\* cited by examiner

*Primary Examiner* — Long T Tran
(74) *Attorney, Agent, or Firm* — SNELL & WILMER L.L.P.

(57) ABSTRACT

An electromechanical brake system is disclosed herein. The electromechanical brake system includes an electromechanical brake actuator, an electronic brake actuator controller coupled to the electromechanical brake actuator, and an interlock. The electromechanical brake actuator includes an actuator motor configured to turn and apply a commanded clamping force and an electromechanical brake actuator park brake configured to, responsive to being activated, maintain the commanded clamping force responsive to power to the actuator motor being turned off. The interlock is configured to receive a first signal from a park brake switch and a second signal from the electronic brake actuator controller and is further configured to activate the electromechanical brake actuator park brake in response to the first signal from the park brake switch being activated and the second signal from the electronic brake actuator controller being activated.

20 Claims, 5 Drawing Sheets

ELECTROMECHANICAL BRAKE INTERLOCK

FIELD

The present disclosure relates to aircraft braking systems, and more specifically, to an electromechanical brake interlock.

BACKGROUND

Typically, an aircraft may comprise an electromechanical brake (E-brake) system that utilizes a plurality of electromechanical brake actuators (EBAs) configured to apply force to a brake stack on an aircraft wheel. As aircrafts are converted to utilize more electricity and thus utilize such E-brake systems, there is a need to protect the E-brake system from certain EBA controller (EBAC) software errors that may erroneously activate parking of an EBA at incorrect times.

SUMMARY

An electromechanical brake system is disclosed herein. The electromechanical brake system includes an electromechanical brake actuator, an electronic brake actuator controller, and an interlock. The electromechanical brake actuator includes an actuator motor configured to turn and apply a commanded clamping force and an electromechanical brake actuator park brake configured to, responsive to being activated, maintain the commanded clamping force responsive to power to the actuator motor being turned off. The electronic brake actuator controller is coupled to the electromechanical brake actuator. The interlock is configured to receive a first signal from a park brake switch and a second signal from the electronic brake actuator controller. The interlock is further configured to activate the electromechanical brake actuator park brake in response to the first signal from the park brake switch being activated and the second signal from the electronic brake actuator controller being activated.

In various embodiments, the second signal is from software in the electronic brake actuator controller.

In various embodiments, the park brake switch is located in a cockpit of an aircraft.

In various embodiments, the electromechanical brake system further includes a wheel speed sensor associated with the electromechanical brake actuator. In various embodiments, the interlock is further configured to receive a wheel speed signal from the wheel speed sensor and wherein the interlock further configured to allow the electromechanical brake actuator park brake to be applied in response to the first signal from the park brake switch being activated, the second signal from software in the electronic brake actuator controller being activated, and the wheel speed signal indicated that a wheel speed is below a wheel speed threshold.

In various embodiments, the interlock includes an AND gate and an electrical switching element.

In various embodiments, the AND gate outputs a logical 1 in response to the first signal from the park brake switch being activated, the second signal from software in the electronic brake actuator controller being activated, and the wheel speed signal indicated that the wheel speed is below the wheel speed threshold thereby activating the electrical switching element and allowing the electromechanical brake actuator park brake to be applied via providing a ground via the electrical switching element that allows a differential voltage to be applied to the electromechanical brake actuator park brake.

In various embodiments, the differential voltage is at least one of +28 volts direct current (VDC) or 130 VDC.

In various embodiments, the electrical switching element is at least one of a relay or a transistor.

In various embodiments, the transistor is a set of transistors.

Also disclosed herein is an aircraft, The aircraft includes an electromechanical brake system. The electromechanical brake system includes an electromechanical brake actuator, an electronic brake actuator controller, and an interlock. The electromechanical brake actuator includes an actuator motor configured to turn and apply a commanded clamping force and an electromechanical brake actuator park brake configured to, responsive to being activated, maintain the commanded clamping force responsive to power to the actuator motor being turned off. The electronic brake actuator controller is coupled to the electromechanical brake actuator. The interlock is configured to receive a first signal from a park brake switch and a second signal from the electronic brake actuator controller. The interlock is further configured to activate the electromechanical brake actuator park brake in response to the first signal from the park brake switch being activated and the second signal from the electronic brake actuator controller being activated.

In various embodiments, the second signal is from software in the electronic brake actuator controller.

In various embodiments, the park brake switch is located in a cockpit of an aircraft.

In various embodiments, the electromechanical brake system further includes a wheel speed sensor associated with the electromechanical brake actuator. In various embodiments, the interlock is further configured to receive a wheel speed signal from the wheel speed sensor and wherein the interlock further configured to allow the electromechanical brake actuator park brake to be applied in response to the first signal from the park brake switch being activated, the second signal from software in the electronic brake actuator controller being activated, and the wheel speed signal indicated that a wheel speed is below a wheel speed threshold.

In various embodiments, the interlock includes an AND gate and an electrical switching element.

In various embodiments, the AND gate outputs a logical 1 in response to the first signal from the park brake switch being activated, the second signal from software in the electronic brake actuator controller being activated, and the wheel speed signal indicated that the wheel speed is below the wheel speed threshold thereby activating the electrical switching element and allowing the electromechanical brake actuator park brake to be applied via providing a ground via the electrical switching element that allows a differential voltage to be applied to the electromechanical brake actuator park brake.

In various embodiments, the differential voltage is at least one of +28 volts direct current (VDC) or +130 VDC.

In various embodiments, the field effect transistor is a P-type MOSFET.

In various embodiments, the field effect transistor is a set of field effect transistors.

Also disclosed herein is a method of parking an electromechanical brake actuator of a brake assembly. The method includes receiving a first signal from a park brake switch, receiving a second signal from software in an electronic brake actuator controller, and, responsive to the first signal being activated and responsive to the second signal being activated, activating, via an interlock, an electromechanical brake actuator park brake in order to park the electromechanical brake actuator and maintain a commanded clamping force responsive to power to the actuator motor being turned off.

In various embodiments, the method further includes receiving a wheel speed signal from a wheel speed sensor associated with the electromechanical brake actuator and, responsive to the first signal being activated, responsive to the second signal being activated, and responsive to the wheel speed signal indicated that a wheel speed is below a wheel speed threshold, activating, via the interlock, the electromechanical brake actuator park brake in order to park the electromechanical brake actuator and maintain the commanded clamping force in the event of losing power.

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
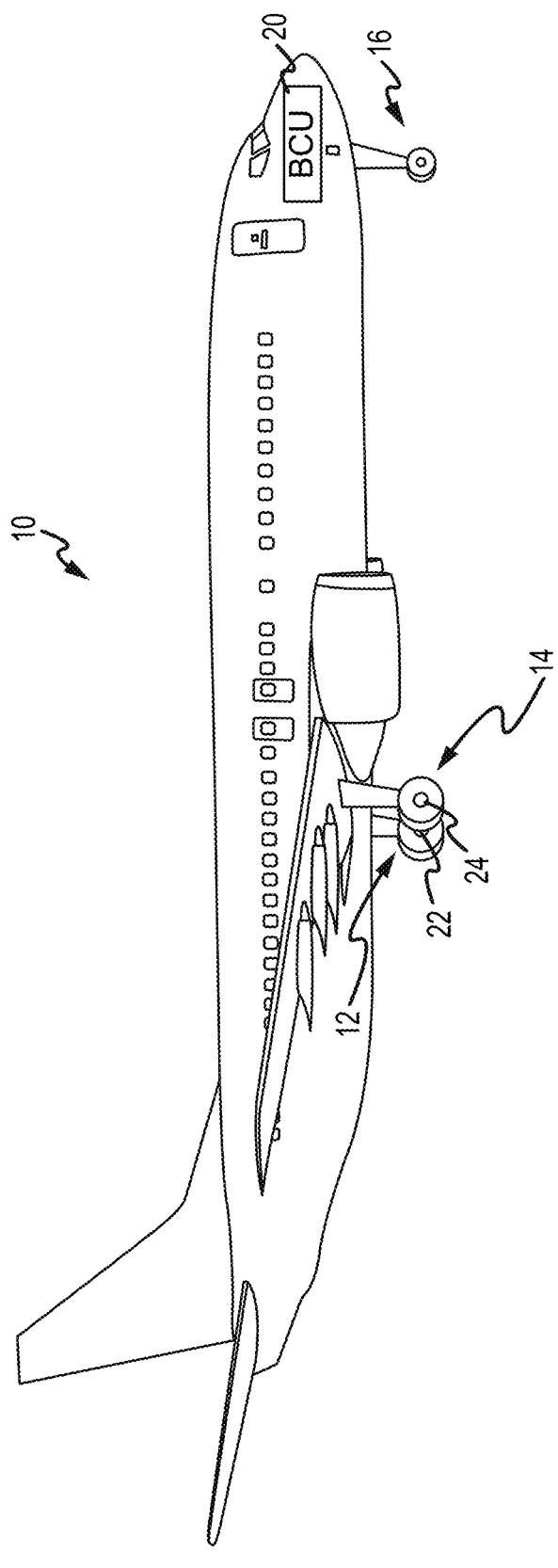
FIG. 1A illustrates an aircraft having multiple landing gear and brakes, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step.

As used herein, "electronic communication" means communication of electronic signals with physical coupling (e.g., "electrical communication" or "electrically coupled") or without physical coupling and via an electromagnetic field (e.g., "inductive communication" or "inductively coupled" or "inductive coupling"). While described in the context of aircraft applications, and more specifically, in the context of brake control, the various embodiments of the present disclosure may be applied to any suitable application.

In hydraulic-based braking systems, uncommanded braking is mitigated with the use of various components, such as shutoff valves and/or hardware interlocks, among others, to add additional protection against software errors that may cause braking when not commanded. Interlocks are not needed for loss of all braking because there is a dissimilar emergency braking system using a handle, cable and hydraulic emergency park brake valve (EPBV). However, typically, there is no such mitigation for complete loss of braking on an electric brake system. Therefore, electromechanical brake (E-brake) interlocks must be developed to protect against software errors that may erroneously activate parking of an electromechanical brake actuator (EBA), i.e. brakes within the EBA itself that maintain a commanded braking force responsive to power to the actuator motor being turned off. That is, as aircrafts are converted to utilize more electricity and thus, utilize such E-brake systems and use a plurality of electromechanical brake actuators (EBAs) configured to apply force to a brake stack on an aircraft wheel, there is a need to protect the E-brake system from certain EBA controller (EBAC) software errors that may erroneously activate parking of an EBA at incorrect times.

Disclosed herein is an electromechanical brake (E-brake) system that provides interlocks that prevents EBAC software from erroneously activating the EBA park brake, i.e. a brake within the EBA itself that maintain a commanded braking force responsive to power to the actuator motor being turned off, at the running clearance position (RCP) position or whenever the EBA's are off the stack, i.e., not in contact with the stack. That is, in various embodiments, in an event where the EBAC software were to initiate a braking command while the EBA park brake was activated, the EBAs would not be able to apply the commanded clamping force as a motor within each EBA is not strong enough to overcome the torque of the EBA park brake, which may be catastrophic on landing or in the case of a rejected takeoff (RTO) event. In that regard, in various embodiments, the electromechanical brake (E-brake) system provides an interlock that prevents EBAC software from erroneously activating the EBA park brake. In various embodiment, the interlock may be an electronic hardware interlock that prevents the EBAC software from activating the EBA park brake unless the certain conditions are met. In various embodiments, a first condition may be that the EBA park brake is not permitted to be activated unless a park brake switch is turned on in the cockpit. In various embodiments, a second condition may be that the EBA park brake is not permitted to be activated unless a wheel speed signal indicates that the aircraft is moving under a predetermined speed.

Referring to FIG. 1A, in accordance with various embodiments, an aircraft 10 is illustrated. The aircraft 10 includes a landing gear, which may include a left main landing gear 12, a right main landing gear 14 and a nose landing gear 16. The landing gear support the aircraft 10 when it is not flying, allowing the aircraft 10 to taxi, take off, and land without damage. While the disclosure refers to the three landing gear configurations just referred, the disclosure nevertheless contemplates any number of landing gear configurations.

Aircraft 10 may further include a brake control unit (BCU) 20 for controlling a left main brake mechanism 22 of left main landing gear 12 and a right main brake mechanism 24 of right main landing gear 14. BCU 20 controls the application of brake mechanisms 22, 24 in response to input from aircraft 10 or an authorized user. BCU 20 further controls a parking brake functionality of brake mechanisms 22, 24 to secure aircraft 10 in place. A plurality of wires that independently control the braking and parking brake functionalities run through aircraft 10 from BCU 20 to left main brake mechanism 22 and right main brake mechanism 24.

Figure 1B:
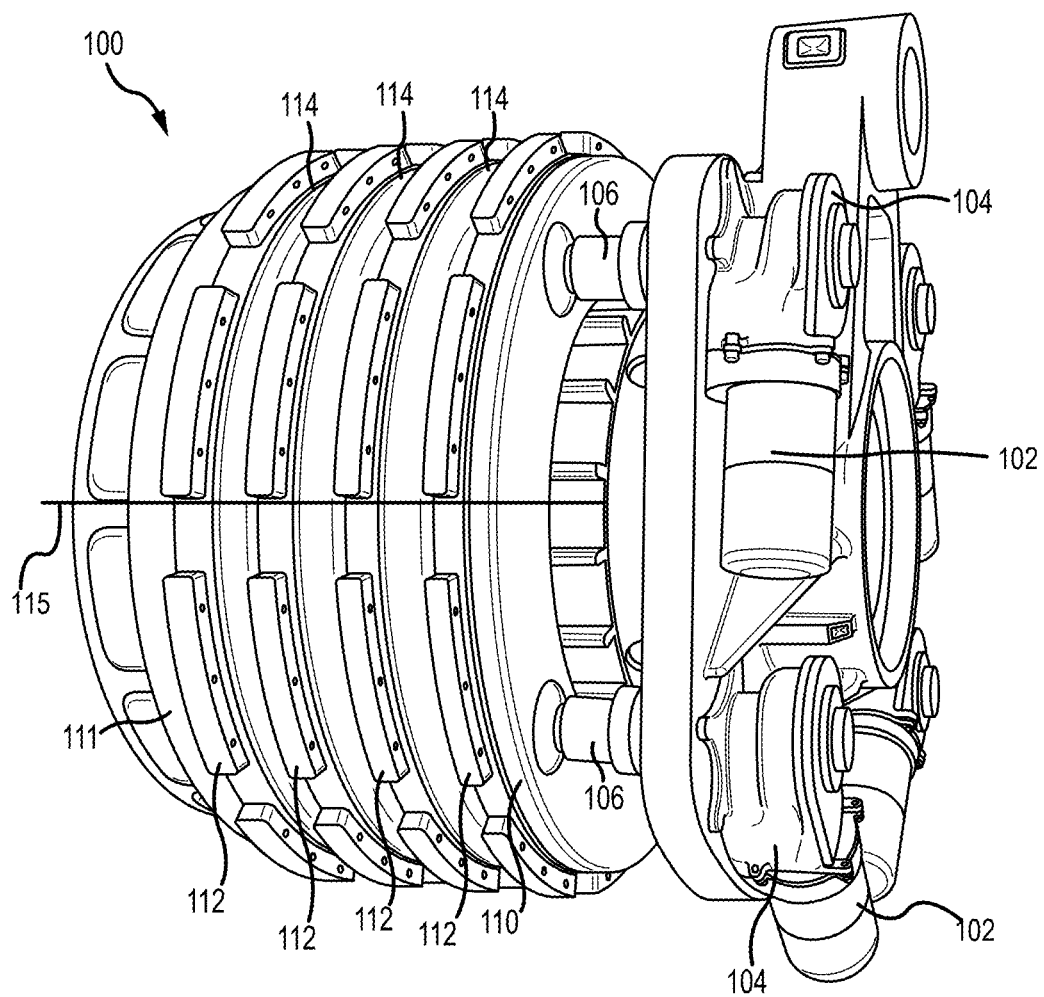
FIG. 1B illustrates an aircraft brake in accordance with various embodiments.

Referring to FIG. 1B, an aircraft brake arrangement 100 in accordance with various embodiments is illustrated. Aircraft brake arrangement 100 may include a plurality of actuator motors 102, a plurality of electromechanical brake actuators (EBAs) 104, a plurality of ball screws 106, an end plate 111 and a pressure plate 110, and a plurality of rotating discs 112 and stators 114 positioned in an alternating fashion between end plate 111 and pressure plate 110. Rotating discs 112 may rotate about an axis 115 and the stators 114 may have no angular movement relative to axis 115. Wheels may be coupled to rotating discs 112 such that a linear speed of the aircraft is proportional to the angular speed of rotating discs 112. As force is applied to pressure plate 110 towards end plate 111 along the axis 115, rotating discs 112 and stators 114 are forced together in an axial direction. This causes the rotational speed of rotating discs 112 to become reduced (i.e., causes braking effect) due to friction between rotating discs 112, stators 114, end plate 111 and pressure plate 110. In response to sufficient force being exerted on rotating discs 112 via pressure plate 110, the rotating discs 112 will stop rotating.

In order to exert this force onto pressure plate 110, actuator motor 102 may cause EBA 104 to actuate. Although referred to herein as EBA 104, it is contemplated that, in various embodiments, EBA 104 may be an electrohydraulic actuator. In various embodiments, actuator motor 102 may be a brushless motor, such as a permanent magnet synchronous motor (PMSM), a permanent-magnet motor (PMM) or the like. In various embodiments, EBA 104 may be coupled to or otherwise operate a motor shaft and a pressure generating device, such as, for example, a ball screw, a ram, and/or the like. In response to actuation or a brake command, EBA 104 causes the motor shaft 204 (seen in FIG. 2) to rotate. Rotation of the motor shaft 204 may cause rotation of a ball screw 106 (e.g., see FIG. 2), and rotational motion of the ball screw 106 may be transformed into linear motion of a ball screws 106. Linear translation of ball screws 106 towards pressure plate 110 applies force on pressure plate 110 towards end plate 111.

Figure 2:
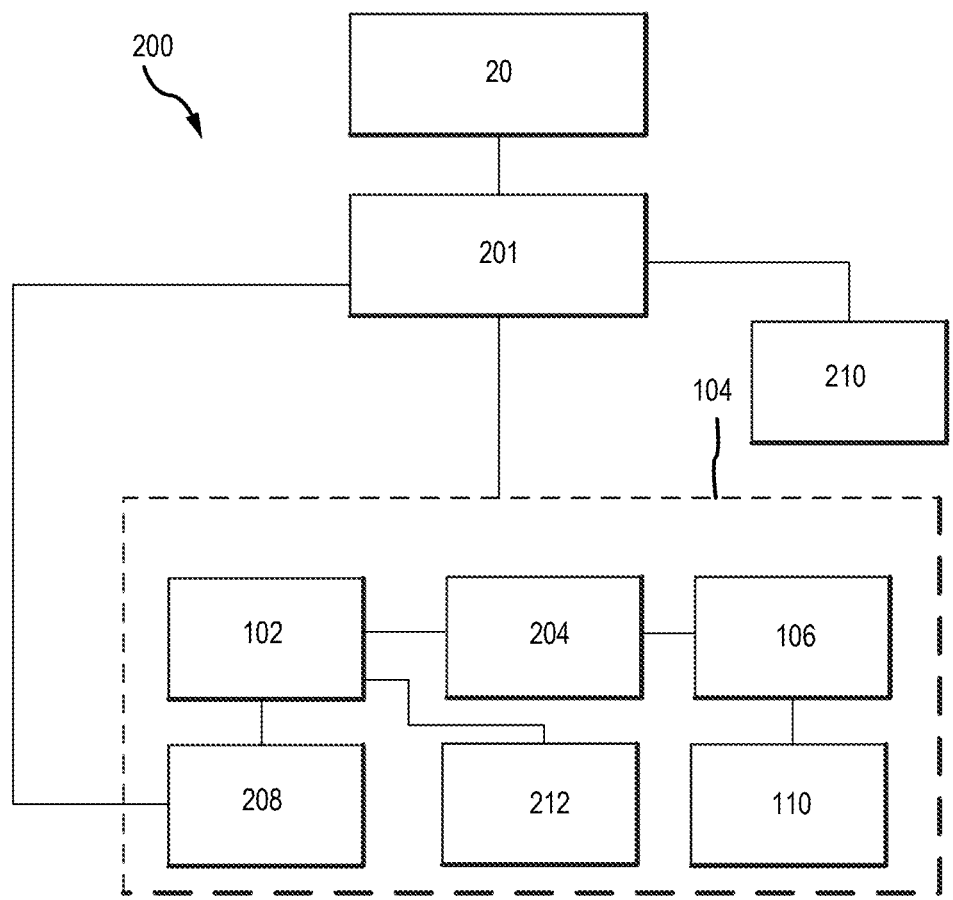
FIG. 2 illustrates a block diagram of an electromechanical brake actuator control system in accordance with various embodiments.

In various embodiments, the BCU 20 and thus, the EBAC 201 (seen in FIG. 2), are configured to, responsive to a pilot providing an indication of a requested force to be applied, command the EBA 104 to apply the commanded force. EBA 104 is actuated in response to electrical current being applied to actuator motor 102. The amount of force applied by EBA 104 is related to the amount of electrical current applied to actuator motor 102. With further reference to FIG. 2, in various embodiments, an electromechanical brake actuator control system 200, or brake system, may include an electromechanical brake actuator controller (EBAC) 201 in communication with each EBA 104. In various embodiments, the electromechanical brake actuator control system 200 may include an electrical current sensor 212 to detect an amount of electrical current provided to actuator motor 102. Electrical current sensor 212 may be in communication with actuator motor 102 and/or with various other components of an EBA 104, an electromechanical brake actuator control system 200, and/or an aircraft 10. In various embodiments, electrical current sensor 212 may be disposed on or adjacent to actuator motor 102. However, in various embodiments, the electrical current sensor 212 may be disposed in any location suitable for detection of electrical current supplied to the actuator motor 102, such as, for example, in the EBAC.

In various embodiments, EBA 104 may further include an EBA park brake 208, i.e. brake park circuitry, configured to maintain a commanded clamping force during certain events, i.e., during loss of power. In that regard, in various embodiments, an interlock (e.g., see FIGS. 3 and 4) is provided within the EBAC 201 that maintains a commanded clamping force without the actuator motor 102 being powered. In various embodiment, the interlock may be an electronic hardware interlock that operates when certain conditions are met. In various embodiments, a first condition is that the EBA park brake 208 is not permitted to be activated unless a park brake switch is turned on in the cockpit. In various embodiments, a second condition may be that the EBA park brake 208 is not permitted to be activated unless a wheel speed signal indicates that the aircraft is moving under a predetermined speed. In that regard, electromechanical brake actuator control system 200 may further include a wheel speed sensor 210 associated with each wheel of the aircraft. In various embodiments, the wheel speed sensor 210 is electrically and logically connected to the EBAC 201 and/or the BCU 20. In various embodiments, the interlock may only activate the EBA park brake 208 responsive to a speed of the aircraft being below a predetermined wheel speed threshold as determined by the wheel speed sensor 210.

Figure 3:
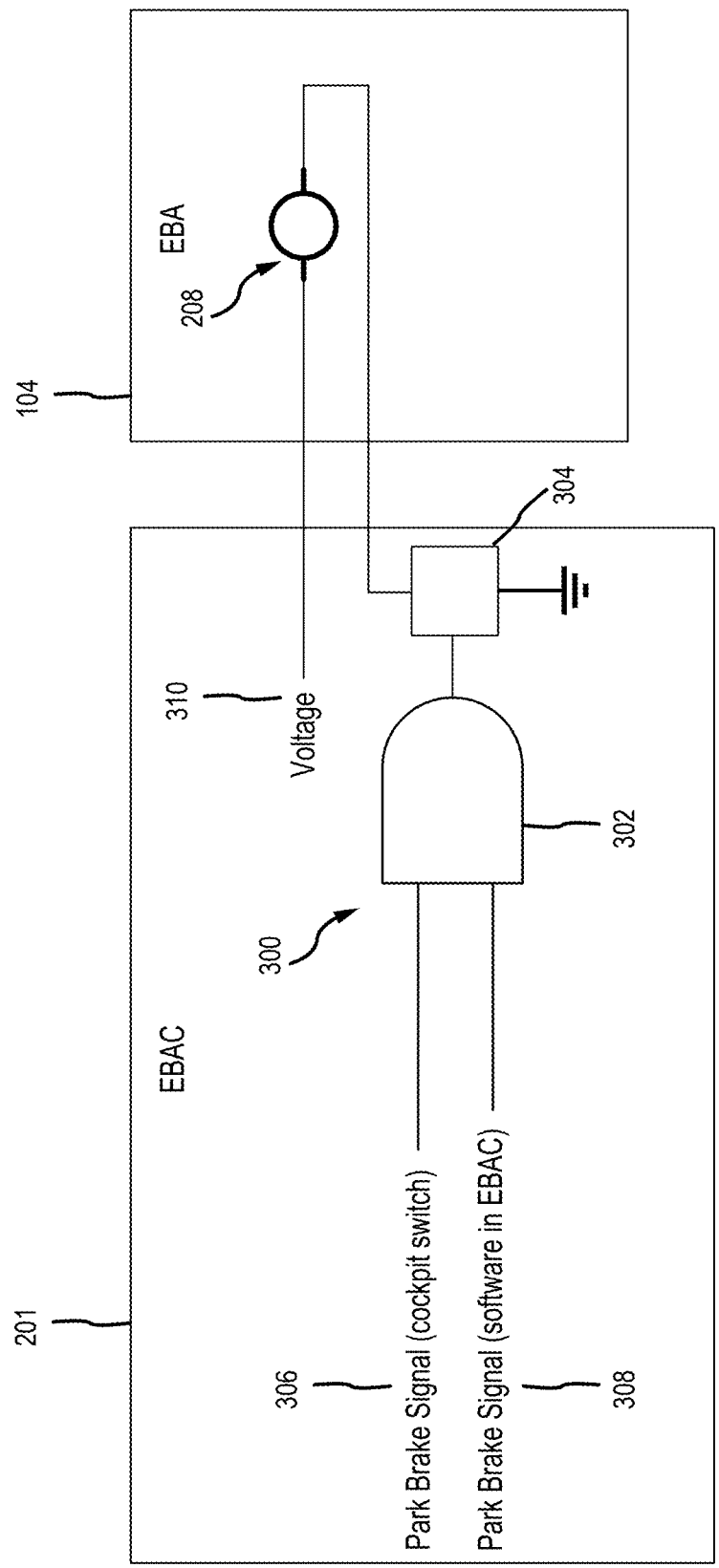
FIG. 3 illustrates an interlock configured to prevent software in an electromechanical brake actuator controller (EBAC) from erroneously activating an EBA park brake within an electromechanical brake actuator (EBA), in accordance with various embodiments.

Referring now to FIG. 3, an interlock configured to prevent software in an electromechanical brake actuator controller (EBAC) from erroneously activating an EBA park brake within an electromechanical brake actuator (EBA) is illustrated, in accordance with various embodiments. In various embodiments, interlock 300, which may be implemented within an EBAC, such as EBAC 201 of FIG. 2, includes an AND gate 302 electrically coupled to an electrical switching element 304 and configured to control the application of the EBA park brake within an EBA, such as the EBA park brake 208 within the EBA 104 of FIG. 2. In various embodiments, the AND gate 302 receives two signal inputs, i.e., a first park brake signal 306 via a park brake switch in a cockpit of an aircraft and a second park brake signal 308 from software in the EBAC 201. In various embodiments, a command/signal, a logical 1 via the second park brake signal 308 from the software in the EBAC 201, to activate the EBA park brake 208 of the EBA 104 and thus, maintain a commanded clamping force responsive to power to the actuator motor being turned off, as shown in FIG. 2, is not allowed unless a command/signal, a logical 1 via the first park brake signal 306 via the park brake switch in the cockpit of the aircraft, is also received. In that regard, in various embodiments, responsive to the AND gate 302 receiving a command/signal, a logical 1 via the second park brake signal 308 from the software in the EBAC 201, to activate the EBA park brake 208 of the EBA 104 and responsive to receiving a command/signal, a logical 1 via the first park brake signal 306 via the park brake switch in the cockpit of the aircraft, the AND gate 302 outputs a logical 1 to the electrical switching element 304, which activates the electrical switching element 304, i.e., provides a ground, thereby allowing the differential voltage 310 to be applied to the EBA park brake 208. In various embodiments, the differential voltage may be at least one of +28 volts direct current (VDC), +130 VDC, other DC voltages, or a varying voltage, among others. In various embodiments, the electrical switching element 304 may be a relay or a transistor, among others. In various embodiments, responsive to the electrical switching element 304 being a transistor, the transistor may be a P-type MOSFET. In various embodiments, the transistor may be a set of P-type MOSFETs.

Figure 4:
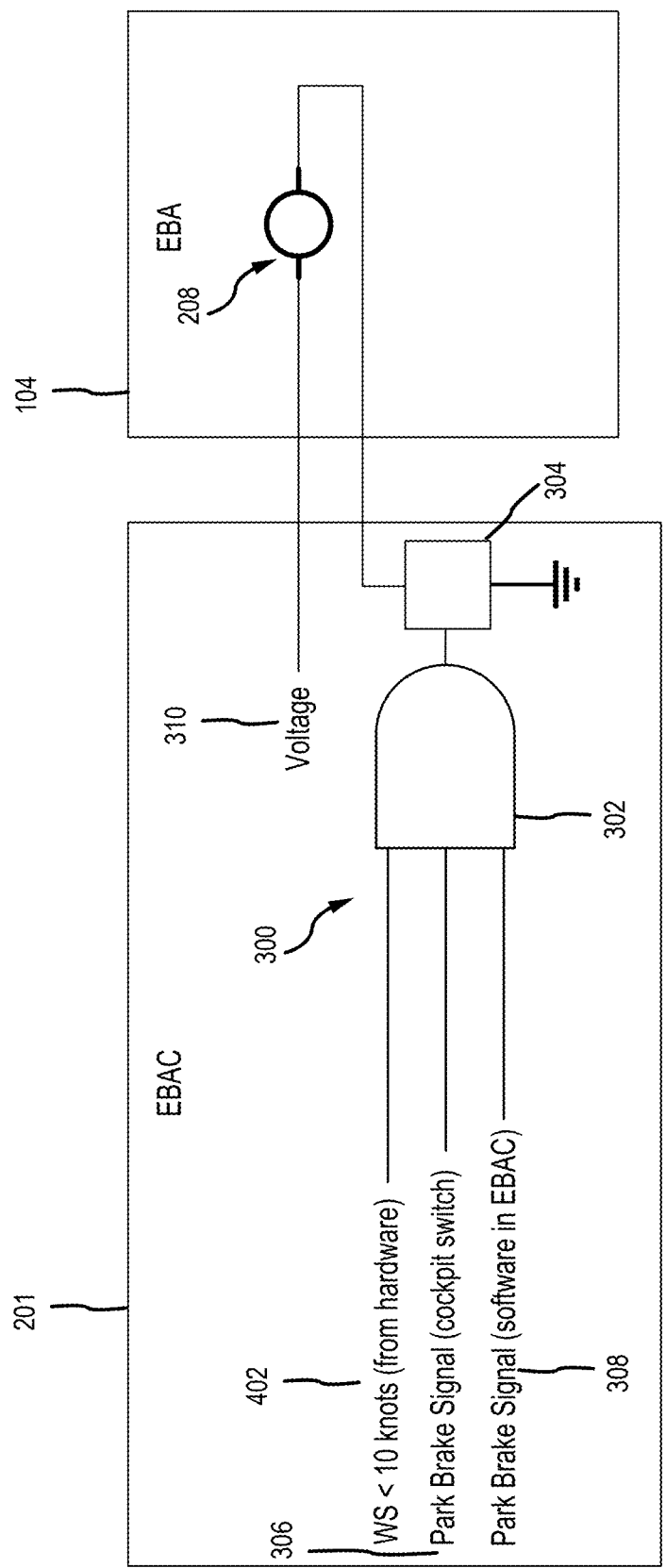
FIG. 4 illustrates an interlock configured to prevent software in an electromechanical brake actuator controller (EBAC) from erroneously activating an EBA park brake within an electromechanical brake actuator (EBA), in accordance with various embodiments.

Referring now to FIG. 4, an interlock configured to prevent software in an electromechanical brake actuator controller (EBAC) from erroneously activating an EBA park brake within an electromechanical brake actuator (EBA) is illustrated, in accordance with various embodiments. It is noted that FIG. 4 is similar to FIG. 3 but includes one additional input to the AND gate 302. In that regard, in various embodiments, interlock 300, which may be implemented within an EBAC, such as EBAC 201 of FIG. 2, includes an AND gate 302 electrically coupled to an electrical switching element 304 and configured to control the application of an EBA park brake within an EBA, such as the EBA park brake 208 within the EBA 104 of FIG. 2. In various embodiments, the AND gate 302 receives three signal inputs, i.e., a first park brake signal 306 via a park brake switch in a cockpit of an aircraft, a second park brake signal 308 from software in the EBAC 201, and a wheel speed signal 402 from a wheel speed sensor associated with the wheel to which the EBA 104 is also associated. In various embodiments, a command/signal, a logical 1 via the second park brake signal 308 from the software in the EBAC 201, to activate the EBA park brake 208 of the EBA 104 and thus, maintain a commanded clamping force responsive to power to the actuator motor being turned off, as shown in FIG. 2, is not allowed unless a command/signal, a logical 1 via the first park brake signal 306 via the park brake switch in the cockpit of the aircraft and a command/signal from the wheel speed sensor 210 of FIG. 2 indicating that the aircraft is moving under a predetermined speed threshold. i.e. a logical 1 via the wheel speed signal 402, are also received. In that regard, in various embodiments, responsive to the AND gate 302 receiving a command/signal, a logical 1 via the second park brake signal 308 from the software in the EBAC 201, to activate the EBA park brake 208 of the EBA 104, responsive to receiving a command/signal, a logical 1 via the first park brake signal 306 via the park brake switch in the cockpit of the aircraft, and, responsive to receiving a command/signal, a logical 1 via the wheel speed signal 402 indicating that the aircraft is moving under a predetermined speed threshold, the AND gate 302 outputs a logical 1 to the electrical switching element 304, which activates the electrical switching element 304, i.e., provides a ground, thereby allowing the differential voltage 310 to be applied to the EBA park brake 208. In various embodiments, the differential voltage may be at least one of +28 volts direct current (VDC), +130 VDC, other DC voltages, or a varying voltage, among others. In various embodiments, the electrical switching element 304 may be a relay or a transistor, among others. In various embodiments, responsive to the electrical switching element 304 being a transistor, the transistor may be a P-type MOSFET. In various embodiments, the transistor may be a set of P-type MOSFETs.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical brake system, the electromechanical brake system comprising:
   an electromechanical brake actuator, the electromechanical brake actuator comprising:
      an actuator motor configured to turn and apply a commanded clamping force; and
      an electromechanical brake actuator park brake configured to, responsive to being activated, maintain the commanded clamping force responsive to power to the actuator motor being turned off;

an electronic brake actuator controller, the electronic brake actuator controller coupled to the electromechanical brake actuator; and an interlock, the interlock configured to receive a first signal from a park brake switch and a second signal from the electronic brake actuator controller, the interlock further configured to activate the electromechanical brake actuator park brake in response to the first signal from the park brake switch being activated and the second signal from the electronic brake actuator controller being activated.

2. The electromechanical brake system of claim 1, wherein the second signal is from software in the electronic brake actuator controller.

3. The electromechanical brake system of claim 1, wherein the park brake switch is located in a cockpit of an aircraft.

4. The electromechanical brake system of claim 1, further comprising:

a wheel speed sensor associated with the electromechanical brake actuator, wherein the interlock is further configured to receive a wheel speed signal from the wheel speed sensor and wherein the interlock further configured to allow the electromechanical brake actuator park brake to be applied in response to the first signal from the park brake switch being activated, the second signal from software in the electronic brake actuator controller being activated, and the wheel speed signal indicated that a wheel speed is below a wheel speed threshold.

5. The electromechanical brake system of claim 4, wherein the interlock includes an AND gate and an electrical switching element.

6. The electromechanical brake system of claim 5, wherein the AND gate outputs a logical 1 in response to the first signal from the park brake switch being activated, the second signal from software in the electronic brake actuator controller being activated, and the wheel speed signal indicated that the wheel speed is below the wheel speed threshold thereby activating the electrical switching element and allowing the electromechanical brake actuator park brake to be applied via providing a ground via the electrical switching element that allows a differential voltage to be applied to the electromechanical brake actuator park brake.

7. The electromechanical brake system of claim 6, wherein the differential voltage is at least one of +28 volts direct current (VDC) or +130 VDC.

8. The electromechanical brake system of claim 5, wherein the electrical switching element is at least one of a relay or a transistor.

9. The electromechanical brake system of claim 8, wherein the transistor is a set of transistors.

10. An aircraft, the aircraft comprising:

an electromechanical brake system, the electromechanical brake system comprising:

an electromechanical brake actuator, the electromechanical brake actuator comprising:

an actuator motor configured to turn and apply a commanded clamping force; and an electromechanical brake actuator park brake configured to, responsive to being activated, maintain the commanded clamping force responsive to power to the actuator motor being turned off;

an electronic brake actuator controller, the electronic brake actuator controller coupled to the electromechanical brake actuator; and an interlock, the interlock configured to receive a first signal from a park brake switch and a second signal from the electronic brake actuator controller, the interlock further configured to activate the electromechanical brake actuator park brake in response to the first signal from the park brake switch being activated and the second signal from the electronic brake actuator controller being activated.

11. The aircraft of claim 10, wherein the second signal is from software in the electronic brake actuator controller.

12. The aircraft of claim 10, wherein the park brake switch is located in a cockpit of the aircraft.

13. The aircraft of claim 10, further comprising:

a wheel speed sensor associated with the electromechanical brake actuator, wherein the interlock is further configured to receive a wheel speed signal from the wheel speed sensor and wherein the interlock further configured to allow the electromechanical brake actuator park brake to be applied in response to the first signal from the park brake switch being activated, the second signal from software in the electronic brake actuator controller being activated, and the wheel speed signal indicated that a wheel speed is below a wheel speed threshold.

14. The aircraft of claim 13, wherein the interlock includes an AND gate and an electrical switching element.

15. The aircraft of claim 14, wherein the AND gate outputs a logical 1 in response to the first signal from the park brake switch being activated, the second signal from software in the electronic brake actuator controller being activated, and the wheel speed signal indicated that the wheel speed is below the wheel speed threshold thereby activating the electrical switching element and allowing the electromechanical brake actuator park brake to be applied via providing a ground via the electrical switching element that allows a differential voltage to be applied to the electromechanical brake actuator park brake.

16. The aircraft of claim 15, wherein the differential voltage is at least one of +28 volts direct current (VDC) or +130 VDC.

17. The aircraft of claim 14, wherein the electrical switching element is at least one of a relay or a transistor.

18. The aircraft of claim 17, wherein the transistor is a set of transistors.

19. A method of parking an electromechanical brake actuator of a brake assembly comprising:

receiving a first signal from a park brake switch;

receiving a second signal from software in an electronic brake actuator controller; and responsive to the first signal being activated and responsive to the second signal being activated, activating, via an interlock, an electromechanical brake actuator park brake in order to park the electromechanical brake actuator and maintain a commanded clamping force responsive to power to the actuator motor being turned off.

20. The method of claim 19, further comprising:

receiving a wheel speed signal from a wheel speed sensor associated with the electromechanical brake actuator; and responsive to the first signal being activated, responsive to the second signal being activated, and responsive to the wheel speed signal indicated that a wheel speed is below a wheel speed threshold, activating, via the interlock, the electromechanical brake actuator park brake in order to park the electromechanical brake actuator maintain the commanded clamping force in the event of losing power.

* * * * *